United States Patent
Roberfroid et al.

(10) Patent No.: US 10,415,995 B2
(45) Date of Patent: Sep. 17, 2019

(54) INERTIAL MEASUREMENT SYSTEM FOR AN AIRCRAFT

(71) Applicant: SAFRAN ELECTRONICS & DEFENSE, Boulogne Billancourt (FR)

(72) Inventors: David Roberfroid, Boulogne Billancourt (FR); Jean-Francois Keiffer, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 15/737,660

(22) PCT Filed: Jun. 14, 2016

(86) PCT No.: PCT/EP2016/063649
§ 371 (c)(1),
(2) Date: Dec. 18, 2017

(87) PCT Pub. No.: WO2016/207029
PCT Pub. Date: Dec. 29, 2016

(65) Prior Publication Data
US 2018/0195878 A1 Jul. 12, 2018

(30) Foreign Application Priority Data

Jun. 23, 2015 (FR) .................................. 15 55758

(51) Int. Cl.
*G01C 25/00* (2006.01)
*G01C 21/16* (2006.01)

(52) U.S. Cl.
CPC .......... *G01C 25/005* (2013.01); *G01C 21/16* (2013.01)

(58) Field of Classification Search
CPC .............................. G01C 25/005; G01C 21/16
See application file for complete search history.

(56) References Cited

U.S. PATENT DOCUMENTS 4,303,978 A * 12/1981 Shaw ..................... G01C 21/16
244/177
4,914,598 A 4/1990 Krogmann et al.
(Continued)

FOREIGN PATENT DOCUMENTS

FR 2 901 363 A1 11/2007

*Primary Examiner* — Russell Frejd
(74) *Attorney, Agent, or Firm* — Muncy, Geissler, Olds & Lowe, P.C.

(57) ABSTRACT

An inertial measurement system for aircraft, the system comprising at least one processor unit connected to at least two inertial units, namely at least one inertial unit of a first type having at least three angular sensors and three linear sensors aligned on three substantially distinct sensing axes, and an inertial unit of a second type comprising at least four angular sensors and four linear sensors aligned on four substantially distinct sensing axes. The system is arranged to calculate one piece of inertial data from the six sensors of the inertial unit of the first type and four pieces of inertial data from four distinct combinations of three angular sensors and three linear sensors selected from the sensors of the inertial unit of the second type, and the processor unit is arranged to compare the four pieces of inertial data from the measurements of the inertial unit of the second type with one another so as to determine whether the inertial unit of the second type has failed.

5 Claims, 1 Drawing Sheet

(56) References Cited

U.S. PATENT DOCUMENTS

| | | | |
|---|---|---|---|
| 5,410,487 A | 4/1995 | Okayama et al. | |
| 7,739,045 B2 * | 6/2010 | Thompson, Jr. ....... | G01C 25/00 342/357.3 |
| 2011/0259078 A1 | 10/2011 | Caron | |

* cited by examiner

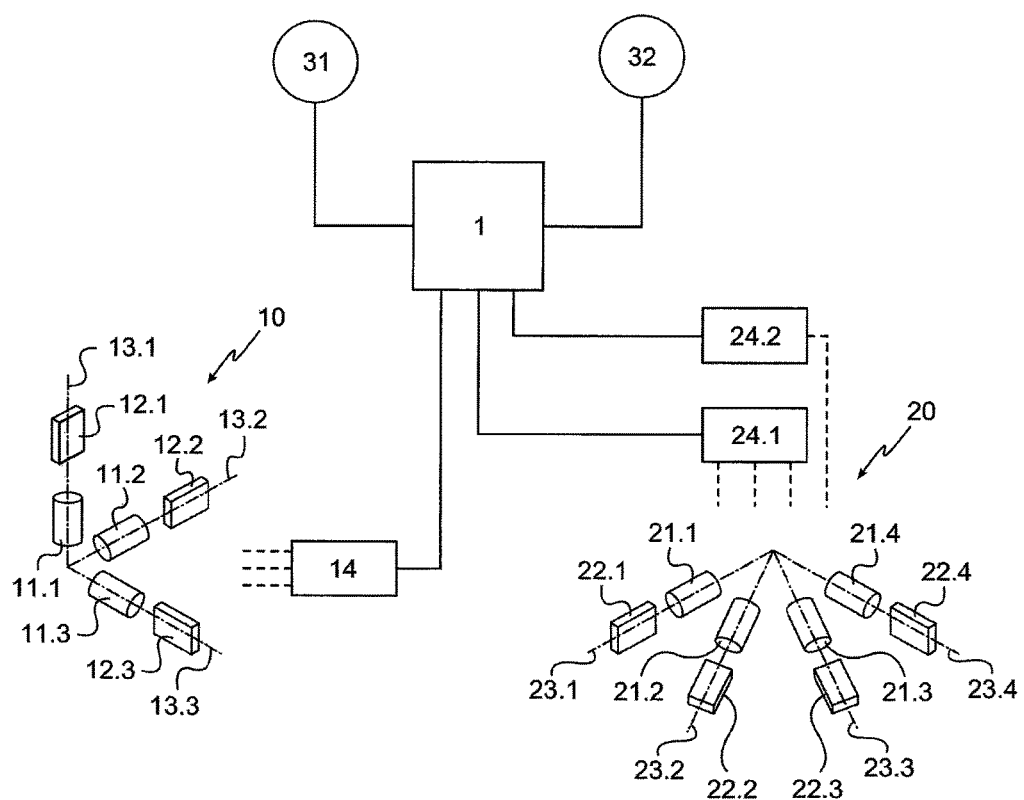

INERTIAL MEASUREMENT SYSTEM FOR AN AIRCRAFT

The present invention relates to inertially detecting flight parameters of an aircraft, in particular for the purposes of controlling movable flight control surfaces of the aircraft. These flight parameters include in particular the attitude and the travel vector of the aircraft.

STATE OF THE ART

There exist aircraft that are fitted with an inertial system for measuring flight parameters, also known as an air data inertial reference system (ADIRS), which system has three inertial units of the same type referred to as air data inertial reference unit ADIRU 1, ADIRU 2, and ADIRU 3, each having a nominal set of three angular inertial sensors and three linear inertial sensors aligned on three sensing axes in a measurement reference frame. The inertial units are connected to a processor unit so that each of them supplies the processor unit with inertial measurements that can be used by the processor unit for controlling the movable control surfaces of the aircraft. Generally, the inertial measurement system is arranged so that the measurements of the ADIRU 1 are presented to the pilot, the measurements of the ADIRU 2 are presented to the copilot, and the measurements of the ADIRU 3, which is used as a redundant unit, can be presented either to the pilot or to the copilot in the event of a failure of the ADIRU 1 or the ADIRU 2, respectively. In order to detect such a failure, the processor unit continuously compares the measurements from the three inertial units with one another in order to ensure that they are mutually consistent. When the measurements supplied by one of the inertial units depart from the measurements supplied by the other two inertial units, that inertial unit is declared to have failed by the processor unit.

A problem arises when there remain only two inertial units and their measurements begin to diverge, since it is then not possible to tell which inertial unit has failed without having recourse to other measurement instruments.

Document FR-A-2 901 363 describes an inertial measurement system having three inertial units, each having three angular sensors and three linear sensors arranged on three sensing axes. That arrangement thus provides redundancy and, what is more, it is hybridized with a satellite positioning system. Although such a system can be considered as being safer, it is nevertheless relatively expensive.

Document U.S. Pat. No. 5,410,487 describes an inertial unit having four sensing axes and using combinations of measurements along those axes for redundancy purposes.

OBJECT OF THE INVENTION

An object of the invention is to provide means for facilitating determining a failure in an inertial measurement system.

BRIEF SUMMARY OF THE INVENTION

To this end, the invention provides an inertial measurement system for aircraft, the system comprising at least one processor unit connected to at least two inertial units, namely at least one inertial unit of a first type having at least three angular sensors and three linear sensors aligned on three substantially distinct sensing axes, and an inertial unit of a second type comprising at least four angular sensors and four linear sensors aligned on four substantially distinct sensing axes. The processor unit is arranged to receive one piece of inertial data from the measurements provided by the six sensors of the inertial unit of the first type and four pieces of inertial data from four distinct combinations of three angular sensors and three linear sensors selected from the sensors of the inertial unit of the second type. The processor unit is also arranged to compare the four pieces of inertial data from the measurements of the inertial unit of the second type with one another so as to determine whether the inertial unit of the second type has failed.

Thus, the presence of four angular sensors and of four linear sensors in the inertial unit of the second type makes it possible to obtain four pieces of inertial data (e.g. the attitude of the aircraft) calculated by excluding in turn one of the four linear sensors and one of the four angular sensors. If all of the sensors are operating correctly, then all the pieces of inertial data calculated from the measurements of the inertial unit of the second type are substantially identical. Under such circumstances, a difference between a piece of inertial data derived from the measurements of the inertial unit of the first type and the pieces of inertial data derived from the inertial unit of the second type reveal a failure of the inertial unit of the first type. If at least one of the sensors of the inertial unit of the second type fails, the four pieces of inertial data will not all be affected in the same manner by that failure, such that the pieces of inertial data derived from the measurements of the inertial unit of the second type will diverge. Detecting such divergence thus makes it possible to reveal the failure.

Other characteristics and advantages of the invention appear on reading the following description of particular, non-limiting embodiments of the invention.

BRIEF DESCRIPTION OF THE FIGURES

Reference is made to the sole accompanying FIGURE, which is a diagram showing a system of the invention.

DETAILED DESCRIPTION OF THE INVENTION

The inertial measurement system of the invention is described below in application to an aircraft piloted by a pilot and a copilot and it is arranged to supply the pilot and the copilot respectively, with inertial data calculated from the inertial data of two distinct inertial units. Naturally other applications are possible.

The inertial system comprises a processor unit 1 connected to two inertial units, namely an inertial unit 10 of a first type and an inertial unit 20 of a second type. The inertial measurement system of the invention is mounted on the aircraft and it is connected both to a first piloting unit 31 presenting in known manner flight parameters to the pilot of the aircraft, and also to a second piloting unit 32 presenting in known manner flight parameters to the copilot of the aircraft. In this example, these flight parameters are displayed on respective screens of each of the piloting units 31 and 32. The inertial measurement system is also connected to a piloting assistance computer of the aircraft, where such a computer is itself known.

In this example, the inertial unit 10 has three angular sensors 11 and three linear sensors 12 aligned on three distinct sensing axes 13 (the sensors and the axes in this example are individually identified by means of indices 1, 2, and 3 associated respectively with the references 11, 12, and 13). The three sensing axes 13 are mutually perpendicular. The inertial unit 10 has a control circuit 14 for controlling the sensors 11, 12. The control circuit 14 is arranged to recover measurement signals coming from the sensors 11, 12 and to transmit these measurement signals or signals representative of the measurement signals to the processor unit 1. In the event of at least one of the sensors 11, 12 needing to be excited in order to operate, the control circuit 14 is arranged to send excitation signals to said sensor. In this example, the angular sensors 11 are vibrating resonator rate gyros and the linear sensors 12 are vibrating resonator accelerometers. The control circuit 14 is thus arranged to excite the angular sensors 11 and the linear sensors 12. The inertial unit 10 is arranged to calculate a piece of inertial data from the three angular sensors 11 and the three linear sensors 12.

The inertial unit 20 in this example has four angular sensors 21 and four linear sensors 22 that are in alignment on four distinct sensing axes 23 (in this example, the sensors and the axes are individually identified by means of indices 1, 2, 3, and 4 associated respectively with the references 21, 22, and 23). The four sensing axes 23 form the diagonals of a cube. The inertial unit 20 also has a first control circuit 24.1 for controlling a first set of sensors comprising the angular sensors 21.1, 21.2, 21.3 and the linear sensors 22.1, 22.2, 22.3, and a second control circuit 24.2 for controlling a second set of sensors comprising the angular sensor 21.4 and the linear sensor 22.4. In the event of at least one of the sensors 21, 22 needing to be excited in order to operate, the control circuit 24.1, 24.2 is arranged to send excitation signals to said sensor. In this example, the angular sensors 21 are vibrating resonator rate gyros and the linear sensors 22 are vibrating resonator accelerometers. The control circuit 24 is thus arranged to excite the angular sensors 21 and the linear sensors 22.

The inertial unit 20 is arranged to calculate four pieces of inertial data from four distinct combinations of three angular sensors and three linear sensors selected from among the sensors 21 and 22, and to do so by means of an algorithm that is different from the algorithm used in the inertial unit 10. Each piece of inertial data comprises an attitude of the aircraft and a travel vector of the aircraft. These four pieces of inertial data are transmitted to the processor unit 1.

The processor unit 1 transmits, to the first piloting unit 31, the inertial data as calculated from the measurements supplied by the six sensors 11 and 12 (this inertial data is referred to below as the first main inertial data), and the processor unit 1 transmits, to the second piloting unit 32, the inertial data calculated from the measurements supplied by the six sensors 21.1, 21.2, 21.3 and 22.1, 22.2, 22.3 (this inertial data being referred to below as the second main inertial data).

Prior to transmitting the main inertial data to the piloting units 31 and 32, the pilot unit 1 compares the first main inertial data and the second main inertial data as calculated at each instant with each other. If the first main inertial data and the second main inertial data calculated at an instant are identical or present between them a difference below a predetermined threshold (taking account of the accuracy expected from the calculated inertial data), the main inertial data is transmitted to the piloting units 31 and 32.

If the first main inertial data and the second main inertial data calculated at an instant present between them a difference greater than the predetermined threshold, the processor unit 1 compares the following pieces of data with one another:
  the second main piece of inertial data;
  the piece of inertial data calculated at the same instant as the second main piece of inertial data, but on the basis of the measurements supplied by the six sensors 21.1, 21.2, 21.4, and 22.1, 22.2, 22.4 (this piece of inertial data being referred to as the first additional piece of inertial data);
  the piece of inertial data calculated at the same instant as the second main inertial data, but on the basis of the measurements supplied by the six sensors 21.1, 21.4, 21.3, and 22.1, 22.4, 22.3 (this piece of inertial data being referred to as the second additional piece of inertial data); and
  the piece of inertial data calculated at the same instant as the second main inertial data, but on the basis of the measurements supplied by the six sensors 21.4, 21.2, 21.3, and 22.4, 22.2, 22.3 (this piece of inertial data being referred to as the third additional piece of inertial data).

If the additional pieces of inertial data and the second main inertial data converge (they are identical or the difference between them is below the predetermined threshold), the processor unit 1 transmits an alert signal to the piloting units 31 and 32 specifying that the first inertial unit 10 has failed and that only the second main inertial data will be presented henceforth both to the pilot and to the copilot.

If the additional pieces of inertial data and the second main inertial data diverge (the difference between them is greater than the predetermined threshold), the processor unit 1 transmits an alert signal to the piloting units 31 and 32 specifying that the second inertial unit 20 has failed and that only the first main inertial data will be presented henceforth both to the pilot and to the copilot.

In the first situation, it is possible to maintain a comparison between additional pieces of inertial data and the second main inertial data in order to detect a failure of the second inertial unit 20.

The processor unit 1 is thus arranged to calculate a difference between the inertial data from the measurements of the first inertial unit and one of the pieces of inertial data from the second inertial unit and to issue an alert when the difference is greater than a predetermined value.

It can be understood that comparing pieces of inertial data makes it possible to verify that they are uniform and consistent, and thus to verify the integrity of the inertial measurements from the inertial units and the proper operation of the inertial units and of their sensors.

Naturally, the invention is not limited to the embodiments described but covers any variant coming within the ambit of the invention as defined by the claims.

In particular, the inertial units may have more angular sensors and more linear sensors than in the example described.

The system may comprise a plurality of processor units.

The system may have more inertial units. For example, there may be two inertial units of the first type providing measurements that are used to supply two pieces of inertial data.

The invention is applicable to any type of algorithm, e.g. of the attitude reference system (ARS) type or the attitude heading reference system (AHRS) type with stabilization of the attitudes by accelerometer measurements, with or without air speed, for the inertial unit of the second type.

The invention is applicable to measurements that are purely inertial or to measurements that are hybrid, including inertial measurements and measurements of some other type, e.g. satellite positioning measurements or measurements from a magnetometer.

The inertial unit of the second type may have a single control circuit for controlling all of the sensors of the unit or it may have two control circuits so that one of the control circuits is associated with some of the sensors of the inertial unit of the second type while the other control circuit is associated with the other sensors of the inertial unit of the second type. Ideally, one of the control circuits is associated with six of the sensors of the inertial unit of the second type (three angular sensors and three linear sensors), and the other control circuit is associated with the other two sensors of the inertial unit of the second type. Under such circumstances, the control circuits are preferably of different technologies.

In a variant, the sensing axes of the sensors of the inertial unit of the second type may comprise three axes that coincide with the three canonical axes together with an axis arranged as the trisector of those three axes.

The invention claimed is:

1. An inertial measurement system for aircraft, the system comprising at least one processor unit connected to at least two inertial units, namely at least one inertial unit of a first type having at least three angular sensors and three linear sensors aligned on three substantially distinct sensing axes, and an inertial unit of a second type comprising at least four angular sensors and four linear sensors aligned on four substantially distinct sensing axes, the system being arranged to calculate one piece of inertial data from the six sensors of the inertial unit of the first type and four pieces of inertial data from four distinct combinations of three angular sensors and three linear sensors selected from the sensors of the inertial unit of the second type, and the processor unit being arranged to compare the four pieces of inertial data from the measurements of the inertial unit of the second type with one another so as to determine whether the inertial unit of the second type has failed and the processor unit is arranged to calculate a difference between the pieces of inertial data derived from the measurements of the inertial unit of the first type and any one of the pieces of inertial data derived from the inertial unit of the second type and to issue an alert when the difference is greater than a predetermined value.

2. The system according to claim 1, the four pieces of inertial data from the measurements of the inertial unit of the second type are calculated by means of the same algorithm.

3. The system according to claim 1, wherein the inertial unit of the second type includes a first control circuit for controlling a first set of sensors comprising three angular sensors and three linear sensors, and a second control circuit for controlling a second set of sensors comprising the fourth angular sensor and the fourth linear sensor.

4. The system according to claim 1, wherein the sensing axes of the sensors of the inertial unit of the second type comprise three axes coinciding with three canonical axes together with an axis arranged on a trisector of these three axes.

5. The system according to claim 1, wherein the sensing axes of the sensors of the inertial unit of the second type are aligned on diagonals of a cube.

* * * * *